Patented May 24, 1932

1,860,092

UNITED STATES PATENT OFFICE

GEORGE D. GRAVES, OF WILMINGTON, DELAWARE, ASSIGNOR TO E. I. DU PONT DE NEMOURS & COMPANY, OF WILMINGTON, DELAWARE, A CORPORATION OF DELAWARE

PROCESS OF ESTER CONVERSION

No Drawing.  Application filed October 31, 1929.  Serial No. 403,918.

This invention relates to a new process of ester formation and more specifically to a process of ester conversion wherein two different esters, representing two different alcohols and two different acids, are converted into the other esters that can be formed from these compounds.

This invention has as an object a convenient method of ester preparation without resorting to the customary methods of starting from an alcohol and an acid. It has as a further object the production of esters by using as a starting material other esters which are capable of interacting to form the desired products. A still further object is to employ certain catalysts in such reactions in order to secure a more favorable action. Other objects will appear hereinafter as the following description proceeds.

As illustrations of the invention, the following examples are given:

Example 1

A mixture of 2 mols of ethyl propionate, 2 mols of butyl acetate, and 2.5 grams of sulfuric acid is subjected to careful fractional distillation. As a result there are obtained 1.3 mols of ethyl acetate and .6 mols of ethyl propionate. There had thus reacted 1.3 to 1.4 mols of ethyl propionate, and the residue was a mixture of butyl acetate and butyl propionate.

Example 2

A mixture of 1 mol of ethyl benzoate, 1 mol of butyl acetate, and 3 grams of sulfuric acid is subjected to careful fractional distillation. As a result there are removed .7 mols of ethyl acetate and .3 mols of butyl acetate. There had thus reacted .7 mols of butyl acetate with the formation of an equivalent amount of ethyl acetate and butyl benzoate. The residue in the still consisted of the unreacted ethyl benzoate together with the butyl benzoate produced.

Example 3

A mixture of 1.1 mols of ethyl lactate, 1.1 mols of butyl acetate, and 4 grams of sulfuric acid gives on fractional distillation 1 mol of ethyl acetate. The residue in the still consisted of the unreacted butyl acetate together with butyl lactate.

Example 4

From a mixture of 1 mol of ethyl propionate, 1 mol of butyl acetate, and 2 grams of para toluene sulfonic acid, are distilled .55 mols of ethyl acetate and .46 mols of ethyl propionate. There had thus been converted .54 mols of ethyl propionate into ethyl acetate. The residue in the still consisted of the resulting unchanged butyl acetate together with the butyl propionate formed.

I have discovered the fact that this reaction can be carried out in the case of many different esters in the foregoing examples, which are illustrative merely. The principle of the invention is to select two esters that will form the desired end products and to allow them to interact under favorable conditions in such a manner and under such operating conditions that one or more of the products of the reaction may continuously be withdrawn from the field of reaction in order to upset the equilibrium existing and thereby to continuously cause the reaction to go forward. In the illustrations given, the ready and convenient method of fractional distillation has been described as an advantageous way of effecting the continuous upsetting of the equilibrium, but other methods may be employed according to the nature of the materials and the conditions of the reaction. The reaction as stated is favored to a considerable extent by the employment of a proper catalyst, and, while a number of catalysts may be employed in conjunction with the foregoing method, I have found that sulfuric acid, para toluene sulfonic acid, phosphoric acid, sodium ethylate, and equivalents may be used with advantageous results.

It is to be understood that the quantitative yield of such reactions will not be identical in the case of all esters, as the equilibrium prevailing in any given system will vary between the different systems, and consequently the final yield obtained will depend upon the initial equilibrium and the nature of the reacting materials. Whatever the specific equilibrium situation may be, however, I have found that the reaction will be assisted by the employment of the catalyst as designated and by the continuous removal of one or more of the products of reaction, so that thereby a larger yield of the desired ester or esters may be obtained. The amount of the catalyst to be employed and the respective quantities of the reacting materials may be varied, as they are not essential to the proper operation of the process. In case a distillation process is employed as shown in the examples above, a temperature for distillation, or for fractional distillation, will be employed which will allow the desired ester product to be separated from the reacting mass without disengaging the substances undergoing reaction. After the lowest boiling product has been removed, the temperature may of course be raised to separate out the other ester and, if desired, the ingredients that had not been changed during the reaction.

As many apparently widely different embodiments of this invention may be made without departing from the spirit thereof, it is to be understood that I do not limit myself to the foregoing examples or descriptions except as indicated in the following patent claims.

I claim:

1. The process of converting two different esters, representing two different aliphatic alcohols and two different carboxylic acids, into the other esters that can be formed therefrom, which comprises reacting the esters in the presence of an inorganic acid catalyst and continuously removing a product of the reaction.

2. The process of converting two different esters, representing two different aliphatic alcohols and two different carboxylic acids, into the other esters that can be formed therefrom, which comprises reacting the esters in the presence of a catalyst selected from a group consisting of sulfuric acid, para toluene sulphonic acid, phosphoric acid, and sodium ethylate and continuously removing by distillation a product of the reaction.

3. The process of converting two different esters, representing two different aliphatic alcohols and two different carboxylic acids, into the other esters that can be formed therefrom, which comprises reacting the esters in the presence of a sulfuric acid catalyst and continuously removing by fractional distillation a product of the reaction.

4. The process of converting two different esters, representing two different aliphatic alcohols and two different monocarboxylic acids, into the other esters that can be formed therefrom, which comprises reacting the esters in the presence of an inorganic acid catalyst and continuously removing by distillation the product of the reaction.

5. The process of converting two different esters, representing two different primary aliphatic alcohols and two different monocarboxylic acids, into the other esters that can be formed therefrom, which comprises reacting the esters in the presence of concentrated sulfuric acid, and subjecting the mixture to fractional distillation to remove one or more of the products formed in order to continuously upset the equilibrium and thereby cause the reaction to proceed.

6. A process of converting two different esters representing two different aliphatic alcohols and two different monocarboxylic acids into the other esters that can be formed therefrom which comprises reacting the esters in the presence of a catalyst selected from a group consisting of sulphuric acid, para toluene sulphonic acid, phosphoric acid, and sodium ethylate.

7. The process of claim 1 in which one of the esters is butyl acetate.

8. The process of claim 1 in which the esters are ethyl propionate and butyl acetate.

9. The process of claim 1 in which the esters are ethyl benzoate and butyl acetate.

10. The process of claim 1 in which the esters are ethyl lactate and butyl acetate.

In testimony whereof, I affix my signature.

GEORGE D. GRAVES.